United States Patent

Nehari et al.

[11] Patent Number: 5,993,758
[45] Date of Patent: Nov. 30, 1999

[54] PROCESS FOR RECOVERY OF ALUMINA AND SILICA

[75] Inventors: Shlomo Nehari, Ramat Hasharon; Chanoch Gorin, Kiriat Haim; Israel J. Lin, deceased, late of Hoff Hacarmel, by Ester Lin, legal representative; Amos Berkovich, Ramat Efal, all of Israel

[73] Assignee: Mashal Alumina Industries Ltd., Israel

[21] Appl. No.: 09/091,457

[22] PCT Filed: Dec. 12, 1996

[86] PCT No.: PCT/IL96/00179

§ 371 Date: Dec. 15, 1998

§ 102(e) Date: Dec. 15, 1998

[87] PCT Pub. No.: WO97/22554

PCT Pub. Date: Jun. 26, 1997

[30] Foreign Application Priority Data

Dec. 15, 1995 [IL] Israel ................................. 116409

[51] Int. Cl.⁶ ................................. C01F 7/22; C01F 7/30
[52] U.S. Cl. .......................... 423/126; 423/132; 423/335; 423/626
[58] Field of Search ..................... 423/123, 126, 423/132, 335, 488, 497, 626

[56] References Cited

U.S. PATENT DOCUMENTS

| | | | |
|---|---|---|---|
| 1,868,499 | 7/1932 | Guertler | 423/123 |
| 2,413,709 | 1/1947 | Hoffman | 423/126 |
| 2,947,604 | 8/1960 | Laist | 423/123 |
| 3,427,127 | 2/1969 | McCollum | 423/126 |
| 4,056,363 | 11/1977 | Messner | 422/252 |
| 4,158,042 | 6/1979 | Deutschman | 423/126 |
| 4,297,327 | 10/1981 | Gjelsvik et al. | 423/126 |
| 4,331,636 | 5/1982 | Svoronos | 423/132 |

FOREIGN PATENT DOCUMENTS 2205558 12/1988 United Kingdom.

OTHER PUBLICATIONS

K. Felker, F. Seeley, Z. Egan and D. Kelmers, "Aluminum From Fly Ash", *Chemitech*, Feb. 1982, pp. 123–128.

F.G. Seeley, R.M. Canon, W.J. McDowell, "Chemical Development of New Processes for the Recovery of Resource Materials from Coal Ash", Oak Ridge National Laboratory, Contract W–7405–eng–26, No date.

*Primary Examiner*—Ngoc-Yen Nguyen
*Attorney, Agent, or Firm*—Greer, Burns & Crain, Ltd.

[57] ABSTRACT

A process for the simultaneous recovery of substantially pure alumina and silica from an aluminosilicate. The process comprises the following steps: (i) heating the aluminosilicate with hydrated $CaCl_2$ to obtain calcium-alumino-silicate and calcium-aluminate products, wherein the $CaCl_2$ is substantially free of $MgCl_2$; (ii) leaching the products with HCl to form a solution comprising $AlCl_3$ and $CaCl_2$, and insoluble silica; (iii) separating the insoluble silica from the solution; and (iv) crystallizing $AlCl_3$ from the solution and recovering the alumina from the crystallized $AlCl_3$. The process may further comprise the following steps: (v) substantially removing $MgCl_2$ from the $CaCl_2$ solution of step (iv); and (vi) recycling the $CaCl_2$ solution for use in step (i).

13 Claims, 1 Drawing Sheet

PROCESS FOR RECOVERY OF ALUMINA AND SILICA

FIELD OF THE INVENTION

The present invention relates to a process for the recovery of substantially pure alumina and silica from raw materials containing aluminosilicates, and particularly from waste products resulting from coal combustion.

BACKGROUND OF THE INVENTION

Coal combustion remains a major source of energy in many parts of the world. The solid waste remaining after the combustion is called coal ash, which comprises fly ash—the fine particles collected from the combustion-off gas by electrostatic precipitators—and the ash remaining at the bottom of the combustion vessels. The volume of coal ash resulting from coal combustion world-wide is constantly on the rise, resulting in an ever increasing problem of disposing the waste without damaging the environment. In addition, the availability of the waste products at no cost and their being adjacent to sources of power and transport make them attractive as raw material for the extraction of various chemical products.

The chemical composition of coal ash varies as a function of the source and type of the coal. However, $Al_2O_3$ and $SiO_2$ are almost always major components of the ash, usually in the form of aluminosilicates and quartz. It would therefore be advantageous to use coal ash as a source for alumina and silica.

The major source of pure alumina today is bauxite, with the alumina generally being extracted by the Bayer process. As bauxite is in ample supply and the alumina can be extracted relatively easily and inexpensively, any alternate method for extracting alumina must be economically competitive with the Bayer process. In calculating the process cost, the savings in disposal and disposal site maintenance costs should be taken into account, as well as environmental considerations.

A number of processes for recovering aluminum from coal ash have been reported (Seeley, F. G., Canon, R. M. and McDowell, W. J., "Chemical Development of New processes for the Recovery of Resource Materials from Coal Ash", Oak Ridge National Laboratory, Contract W-7405-eng-26; Felker, K., et al, "Aluminum from Fly Ash", Chemtech 12(2):123–8 (1982)). These include direct acid leach methods, lime-sinter and lime-soda-sinter methods, a salt-soda sinter process and the Calsinter process.

Direct acid leaching (either single-stage or multi-stage) with HCl, $HNO_3$, or $H_2SO_4$ usually results in quite low recovery rates of Al (under 50%).

Lime and lime/soda sinter processes involve sintering coal wastes at 1200–1300° C. with powdered limestone ($CaCO_3$) or limestone and soda ash ($Na_2CO_3$) to form calcium or sodium aluminates. The aluminates are then dissolved by leaching with $Na_2CO_3$.

In the salt-soda sinter process, a NaCl—$Na_2CO_3$ mixture is sintered with fly ash, quenched in a water leach, and then leached in a dilute $HNO_3$ or $H_2SO_4$ solution.

The Calsinter process (developed at Oak Ridge National Laboratory, Tennessee, U.S.A.) involves the combination of a $CaSO_4$—$CaCO_3$-fly ash sintering system and an acid leach with $H_2SO_4$.

Recently, another method for recovery of alumina from alumino-silicates has been described in GB 2,205,558. In this method, the alumino-silicate is reacted with hydrated calcium and/or magnesium chloride, with or without a minor proportion of sodium chloride. A leached water-insoluble residue is obtained which is treated, preferably with the application of heat, with a mineral acid such as HCl which forms a water-soluble aluminum salt. The salt is then diluted with water to produce an aqueous solution of the aluminum salt and an insoluble residue comprising hydrated silica. The aluminum is then recovered from the salt solution.

None of the above processes relates to the simultaneous extraction of silica from coal ash.

U.S. Pat. No. 1,868,499 to Guertler describes a process for the recovery of alumina from silicious materials such as clay, leucite and silicious bauxite. The process comprises the steps of heating the silicious material with $CaCl_2$ at 650–900° C., treating the heated mixture with HCl to dissolve and separate $CaCl_2$ for reuse and conversion of the aluminum to $AlCl_3$, separating the non-gelatinous silicic acid precipitate, and purifying the $AlCl_3$ solution and decomposing to form alumina. There is no indication of the purity of the extracted metal oxides, nor is there any indication that the recycled $CaCl_2$ undergoes treatment.

BRIEF SUMMARY OF THE INVENTION

It is an object of the present invention to provide a process for the simultaneous recovery of alumina and silica from various aluminosilicate-containing materials, and particularly from coal ash.

It is a further object of the present invention to provide a high yield process which results in the recovery of substantially pure alumina and silica.

It is a still further object of the invention to provide an extraction process which is economically competitive with known processes of alumina extraction.

According to the present invention, there is provided a process for the simultaneous recovery of substantially pure alumina and silica from an aluminosilicate comprising the following steps:

(i) heating the aluminosilicate with hydrated $CaCl_2$ to obtain calcium-alumino-silicate and calcium-aluminate products, wherein the $CaCl_2$ salt is substantially free of $MgCl_2$;

(ii) leaching said products with HCl to form a solution comprising $AlCl_3$ and $CaCl_2$ and insoluble silica;

(iii) separating the insoluble silica from the solution; and (iv) crystallizing $AlCl_3$ from the solution and recovering the alumina from the crystallized $AlCl_3$.

The term "substantially pure" as used in the present specification with respect to the alumina and silica products preferably relates to a purity of >97%, and most preferably to a purity of >99%.

In a preferred embodiment of the present invention, the process comprises the following further steps:

(v) substantially removing $MgCl_2$ from the $CaCl_2$ solution of step (iv); and (vi) recycling the $CaCl_2$ solution for use in step (i).

The reuse of $CaCl_2$ contributes to the efficiency of the process.

According to another preferred embodiment of the present invention, Fe is extracted from the $AlCl_3$ solution of step (ii) by either ion exchange or solvent extraction prior to or after the $AlCl_3$ crystallization of step (iv).

The novel process of the present invention differs from previously described processes, such as those described in GB 2,205,558 and U.S. Pat. No. 1,868,499, in that $MgCl_2$ is removed from the $CaCl_2$ salt prior to the heating step.

Heating the aluminosilicate-containing material in the presence of $MgCl_2$ and $AlCl_3$ results in the formation of spinel $MgO.Al_2O_3$ (71.8% $Al_2O_3$). Spinel is insoluble in HCl and therefore precipitates with the silica together with the alumina contained in it, reducing the yield of alumina and contaminating the silica.

The $CaCl_2$ which is recovered from the process for recycling must also be purified from $MgCl_2$, since many sources of aluminosilicates contain small amounts of Mg impurities which dissolve in HCl during the leaching stage. Preferably, the $MgCl_2$ is removed by precipitation with $Ca(OH)_2$.

Thus, the use of $CaCl_2$ which is substantially free of Mg in the heating step significantly contributes to the yield and purity of the products. This affects the efficiency and profitability of the process, making it economically competitive with respect to the Bayer process.

BRIEF DESCRIPTION OF THE DRAWING

The present invention will be better understood from the following detailed description of preferred embodiments, taken in conjunction with FIG. 1 which is a flow diagram of the process of the invention.

DETAILED DESCRIPTION OF PREFERRED EMBODIMENTS

Figure 1:
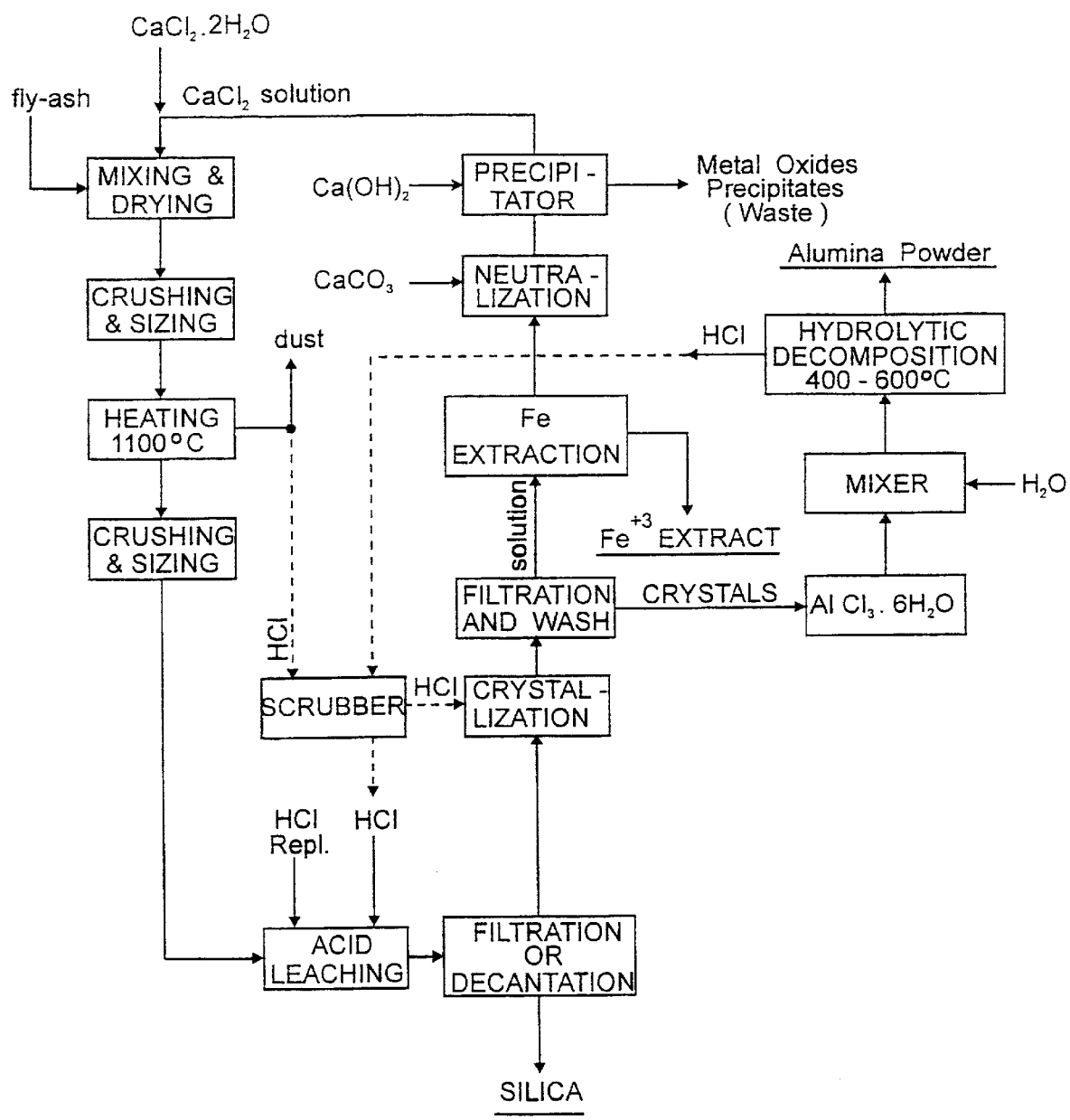

The process will now be described in a general manner.

The raw materials which can be used in the process of the invention include coal reject, fly ash, collieries, kaolin, shale, clays, and other aluminosilicate containing materials. The hydrated $CaCl_2$ can be in either salt form or brine.

In the first step of the process of the invention, hydrated $CaCl_2$ is reacted with a material containing aluminosilicates and at a temperature of between 900–1300° C., and preferably at a temperature of 1000–1100° C. This temperature is lower than the temperatures of previously described processes (1300–1400° C.), but higher than the temperature used in the process described in the Guertler patent, supra. The $CaCl_2$ is added to the alumino-silicate-containing material at a weight ratio of 0.5:1–3:1 depending on the phase composition of the material and its relative alumina content, as well as on the concentrations of mullite and silica. Most preferably, the weight ratio is in the range of 0.5:1–2:1. Preferably, the mixture of alumino-silicate and $CaCl_2$salt is dried at 200–250° C. to obtain a solid mixture prior to heating (sintering).

The aluminosilicate reacts with the $CaCl_2$, for example according to the following reaction:

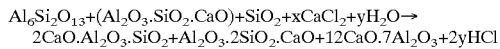

where x and y=2–4.

The evolved HCl can be absorbed in a gas trap and used in the later steps.

In the second step, the aluminum and calcium salts are leached from the calcium-alumino-silicate by HCl at a concentration of 2–8N. According to the previous example, the reaction is as follows:

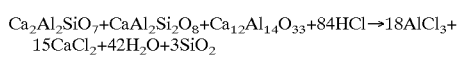

The resulting solution may contain a number of salts in addition to $AlCl_3$ and $CaCl_2$ such as $FeCl_3$, $MgCl_2$ and heavy metals. The $SiO_2$ residue can be separated from the salt solution by known methods such as filtration and decantation. The $SiO_2$ will usually be of greater than 97% purity and at a yield of >90%.

In the final step of the process, the $AlCl_3$ is separated from the solution by concentration and crystallization in a strongly acidic environment (HCl). Due to differences in solubility in the presence of a high chloride ion concentration, the $AlCl_3$ crystallizes before the other salts in the solution. The $AlCl_3$ crystals are filtered out and alumina is recovered by hydrolytic decomposition according to the following reaction:

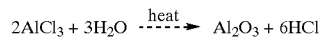

The HCl can be recovered for reuse. The $Al_2O_3$ will usually be recovered at a purity of >99% and a yield of >95%.

The Fe can also be recovered from the solution by either ion exchange or liquid extraction prior to or after the $AlCl_3$ crystallization.

The remaining solution contains a high concentration of $CaCl_2$ which can be recovered for reuse in the first step of the process after removal of $MgCl_2$, for example by precipitation with $Ca(OH)_2$. Precipitation with $Ca(OH)_2$ also removes other metal chlorides present in the solution.

FIG. 1 illustrates the complete process of the invention including the recycling of various components.

The following examples illustrate various aspects of the invention.

EXAMPLE 1

50 parts by weight of fly ash were mixed with 50 parts by weight of calcium chloride dihydrate.

The mixture was heated for 1 hour at 1100° C. and then kept at 1100° C. for an additional hour during which HCl vapors were released. The solid product was thoroughly leached with hot HCl 6N solution. 20 parts by weight of the product were leached for 2 hours with 100 ml of 6N HCl at 103° C.

Analysis of the residue on a dry base was:

|  | weight % |
| --- | --- |
| $SiO_2$ | 98 |
| CaO | 0.5 |
| $Al_2O_3$ | 0.6 |
| $Fe_2O_3$ | 0.1 |
| $TiO_2$ | 0.6 |
| Alkalies | 0.2 |

Examination of the acid solution obtained by leaching showed that it contained more than 95% of the total content of Alumina in the fly ash used, and other metal chlorides in minor quantities.

$AlCl_3*6H_2O$ was crystallized from the leaching solution by increasing the hydrochloric acid concentration to 30%. The crystals were filtered, washed with HCl and dissolved before being hydrolytically decomposed by heating at 400–600° C. to produce pure alumina.

EXAMPLE 2

930 parts by weight of $CaCl_2*2H_2O$ were dissolved in 485 parts by weight of water. 790 parts by weight of fly ash were added to the solution. The mixture was dried for 3 hours at 230° C. The dry product was then heated at 1100°

C. for 1 hour and then kept at 1100° C. for an additional hour during which HCl vapors were released.

The product was thoroughly leached with a hot 6N HCl solution. 20 parts by weight of the product were leached for 2 hours with 100 ml of 6N HCl at 103° C.

Silica content in the residue was 98.6% of the dry material. The yield was 95%.

Examination of the acid solution obtained by leaching showed that it contained 98% of the total content of Alumina in the fly ash used. $AlCl_3*6H_2O$ was crystallized from the leaching solution by increasing the HCl concentration to 30%. The crystals were filtered and dissolved before hydrolytic decomposition by heating at 400–600° C. to produce pure alumina.

EXAMPLE 3

The composition of the acidic filtrate from the crystallization step of the $AlCl_3*6H_2O$ of Example 2 was:

|           | weight % |
|-----------|----------|
| $AlCl_3$  | 1.54     |
| $FeCl_3$  | 1.38     |
| $CaCl_2$  | 14.4     |
| $MgCl_2$  | 0.7      |
| $TiCl_4$  | 0.41     |
| Solubles  | 1.02     |
| Sulfates  | 4.71     |
| $H_2O$    | 41.8     |
| HCl (liq.)| 34.1     |
| total     | 100      |

Fe ions were extracted from the above solution. 654 parts by weight of the solution were then treated with 7.35 parts by weight of $CaCO_3$ and subsequently with 20.5 parts by weight of $Ca(OH)_2$ to precipitate $Mg(OH)_2$ and the insoluble metal hydroxides and gypsum. The composition of the purified solution is:

|                 | weight % |
|-----------------|----------|
| $AlCl_3$        | 1.6      |
| $CaCl_2$        | 35       |
| Alkalies        | 1.5      |
| other chlorides | 0.7      |
| $H_2O$          | 61.2     |
| total           | 100      |

420 parts by weight of the purified solution were mixed with 200 parts by weight of fly ash. The mixture was heated to dryness at 220° C. The dry product was than heated at 1100° C. for 1 hour and then kept at 1100° C. for an additional 30 minutes during which HCl vapors, NaCl, $FeCl_3$, etc. were released.

The product was thoroughly leached with a hot 6N HCl solution. 20 parts by weight of the product were leached for 2 hours with 200 ml of 3N HCl at 103° C.

Silica content in the residue was 98.8% of the dry material. The yield was 95.5%.

Examination of the acid solution obtained by leaching showed that it contained 97% of the total content of Alumina in the fly ash used. $AlCl_3*6H_2O$ was crystallized from the leaching solution by increasing the hydrochloric acid concentration to 30%. The crystals were filtered and dissolved prior to hydrolytic decomposition by heating at 400–600° C. to produce pure alumina.

While the present invention has been described in terms of several preferred embodiments, it is expected that various modifications and improvements will occur to those skilled in the art upon consideration of this disclosure.

The scope of the invention is not to be construed as limited by the illustrative embodiments set forth herein, but is to be determined in accordance with the appended claims.

We claim:

1. A process for the simultaneous recovery of substantially pure alumina and silica from an aluminosilicate comprising the following steps:

(i) heating said aluminosilicate with hydrated $CaCl_2$ to obtain calcium-alumino-silicate and calcium-aluminate products, wherein said $CaCl_2$ is substantially free of $MgCl_2$;

(ii) leaching said products with HCl to form a solution comprising $AlCl_3$ and $CaCl_2$, and insoluble silica;

(iii) separating said insoluble silica from said solution;

(iv) crystallizing and removing $AlCl_3$ from said solution and recovering said alumina from said crystallized $AlCl_3$;

(v) substantially removing $MgCl_2$ from the remaining solution which contains $CaCl_2$ of step (iv); and (vi) recycling the $CaCl_2$ solution of step (v) for use in step (i).

2. A process according to claim 1 wherein said aluminosilicate is contained in a material selected from the group comprising coal reject, fly ash, kaolin shale and clays.

3. A process according to claim 1 wherein said $CaCl_2$ is added to said aluminosilicate at a weight ratio of 0.5:1–3:1.

4. A process according to claim 1 wherein said insoluble silica is separated from said solution in step (iii) by filtration.

5. A process according to claim 1 wherein said insoluble silica is separated from said solution in step (iii) by decantation.

6. A process according to claim 1 wherein said alumina is recovered from said crystallized $AlCl_3$ in step (iv) by hydrolytic decomposition.

7. A process according to claim 1 wherein said Mg is removed from said remaining solution by precipitation with $Ca(OH)_2$.

8. A process according to claim 1 wherein said $CaCl_2$ salt used in step (i) is in the form of a brine.

9. A process according to claim 1 wherein the mixture of alumino-silicate and $CaCl_2$ salt of step (i) is dried at 200–250° C. prior to heating.

10. A process according to claim 1 wherein said heating is carried out at a temperature of 900–1300° C.

11. A process according to claim 10 wherein said heating is carried out at a temperature of 1100–1220° C.

12. A process according to claim 1 wherein Fe is extracted from said $AlCl_3$ solution of step (ii) by either ion exchange or liquid extraction prior to the $AlCl_3$ crystallization of step (iv).

13. A process according to claim 1 wherein Fe is extracted from said $AlCl_3$ solution of step (ii) by either ion exchange or liquid extraction after the $AlCl_3$ crystallization of step (iv).

* * * * *